United States Patent
Khayrallah et al.

(10) Patent No.: US 6,490,314 B1
(45) Date of Patent: Dec. 3, 2002

(54) METHOD FOR OVERLAY OF NARROWBAND AND WIDEBAND COMMUNICATION SYSTEMS

(75) Inventors: Ali S. Khayrallah, Apex, NC (US); Kumar Balachandran, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/158,996

(22) Filed: Sep. 23, 1998

(51) Int. Cl.[7] ............................................. H04B 1/713
(52) U.S. Cl. ...................................... 375/132; 375/131
(58) Field of Search ................................ 375/132, 131, 375/140, 146; 370/487, 529, 537

(56) References Cited

U.S. PATENT DOCUMENTS 5,432,814 A * 7/1995 Hasegawa ................. 370/342

* cited by examiner

Primary Examiner—Stephen Chin
Assistant Examiner—Kevin Kim
(74) Attorney, Agent, or Firm—Coats & Bennett, P.L.L.C.

(57) ABSTRACT

The present invention relates to methods and systems for wireless communication wherein a plurality of narrowband carrier frequencies is overlaid with at least one wideband carrier frequency. In particular, the present invention relates to maintaining radio communication on the narrowband carrier frequencies closest to the edge of the bandwidth of the wideband carrier frequency in order to reduce system interference. This is accomplished by using frequency hopping to preferentially switch radio communication to narrowband carrier frequencies closest to the edge of the bandwidth of the wideband carrier frequency. Thus, the present invention discloses systems and methods which allow several communication devices to occupy the same frequency spectrum while maintaining interference at acceptable levels.

52 Claims, 4 Drawing Sheets

METHOD FOR OVERLAY OF NARROWBAND AND WIDEBAND COMMUNICATION SYSTEMS

NATURE OF THE INVENTION

The present invention relates generally to wireless communication systems and, more particularly, to methods and systems for overlaying narrowband carrier frequencies and wideband carrier frequencies while maintaining system interference at acceptable levels.

BACKGROUND OF THE INVENTION

The principle of using radio frequencies for wireless communications between two or more communication devices has been known for many years. Over the past several years, many wireless radio communication devices have been created such as pagers, cellular phones, and modems. In the near future, many more devices will be developed and marketed to take advantage of wireless communication. The number of radio carrier frequencies allocated for use is finite and the frequency allocation is controlled by the Federal Communications Commission ("FCC") in the United States. Therefore, the carrier frequencies allocated for radio communication must be optimally arranged to allow many users to simultaneously access a wireless communication system without experiencing interference.

In many systems, each wireless communication device is set up for radio communication by assigning a unique pair of carrier frequencies to the device when it is active. One of the carrier frequencies is used by the communication device to send data to a base station and the other carrier frequency is used by the base station to send data to the communication device. These carriers usually have an assigned bandwidth, which may be something like 30 kHz, for example. Therefore, during operation of the communication device, two different carrier frequencies are being used to send and receive data over the wireless communication network. This scheme is generally known as frequency division multiplexing (FDMA) and is the basis of a majority of wireless communication systems in operation, including analog cellular systems.

As in broadcasting, a carrier frequency is defined by its center frequency and bandwidth. The bandwidth of the carrier frequency represents a continuous range of frequencies or wave lengths that are designated by the lowest and highest frequency. Essentially, bandwidth is a measure of the amount of spectrum space a carrier frequency occupies.

Three multiple access methods are widely used or proposed; they are (1) the previously discussed FDMA system, where each carrier is occupied by a single user; (2) time division multiple access (TDMA), where each carrier is shared by a number of users, and each user exclusively occupies a time slot of the carrier; and (3), code-division multiple access (CDMA), where each carrier is shared by a number of users, and each user exclusively occupies a code, or spreading sequence that defines a carrier frequency. Note that most TDMA and CDMA systems use many carriers, and thus share that feature with pure FDMA systems. An example of a FDMA system can be found in a traditional analog cellular system, while CDMA and TDMA systems are commonly found in digital systems.

The CDMA communication protocol is used for microwave point-to-point communications, satellite communications, and military communications. With CDMA, each user of the wireless communication system is assigned a unique code to differentiate among users of the system. CDMA is based on the principle of direct sequence and is a wideband spread spectrum technology. The CDMA carrier frequency is reused in every cell of the system and each communication device in the cell is assigned a unique code.

TDMA is another example of spread spectrum technology that allows multiple users to occupy the same carrier frequency. The TDMA format used in the United States follows the IS-54 and IS-136 standards and is referred to as the North American digital cellular ("NADC") format. IS-54 and IS-136 use the same carrier frequency bandwidth as analog cellular, namely 30 kHz, for each carrier frequency. As such, TDMA uses a narrowband carrier frequency to conduct radio communication between communication devices. TDMA gives wireless communication systems the ability to operate with three to six users sharing the same carrier frequency at the same time.

Spread spectrum is a term that is used to describe a wide variety of different technology platforms in wireless communication. A spread spectrum system is any communication system that deliberately occupies more bandwidth than the minimum required for data transfer. Spread spectrum systems offer good immunity to noise and interference.

As previously stated, the frequency spectrum allocated for public use in the United States by the FCC is limited to a finite range. Presently, all over the world, there is a substantial increase in the number of wireless communication devices. As such, a need exists for methods and systems that can maximize the number of users that can simultaneously access a wireless communication system without experiencing excessive interference. The solution to this problem must be able to account for, and handle, each of the described basic multiple access technologies used for radio communication. The present invention concerns methods and systems for wireless communications which overlay available narrowband carrier frequencies of TDMA and FDMA systems with the wideband frequencies of CDMA systems to maximize the number of users capable of using the wireless communication systems.

SUMMARY OF THE INVENTION

The present invention relates to methods and systems for wireless communication wherein a plurality of narrowband carrier frequencies of TDMA or FDMA systems is overlaid with direct sequence wideband carrier frequencies of a CDMA system. The narrowband carrier frequencies are preferentially selected by frequency hopping to be at the edges of the bandwidth of the wideband carrier frequencies. The frequency hopping is based on the load of the wireless communication network and is implemented by controlling the transmitter to preferentially select the edges of the bandwidth of the wideband carrier frequencies to conduct wireless communication between the devices using the narrowband carrier frequencies. This reduces the interference experienced by the wideband carrier frequencies.

Frequency hopping is a means by which data communication on one carrier frequency is transferred over a period of time to a different predetermined carrier frequency. In the invention, a control system continuously preferentially maximizes radio communication on a narrowband carrier frequency having a center frequency closest to the edge of the bandwidth of the plurality of wideband frequencies.

DETAILED DESCRIPTION OF THE PREFERRED EMBODIMENTS

Figure 1:
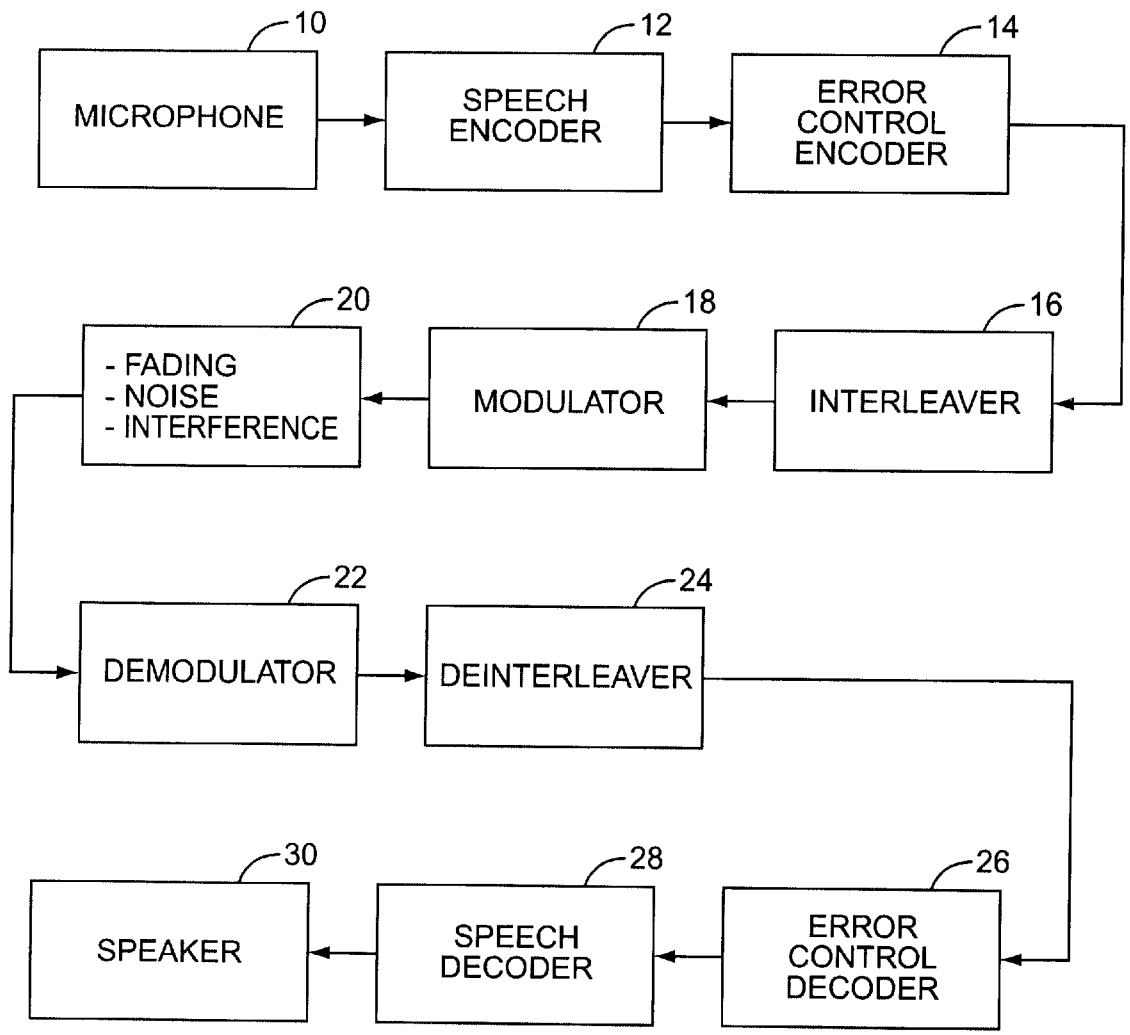
FIG. 1 represents a basic block diagram of an analog or digital communication device.

The present invention discloses a method for overlaying a narrowband radio communication system and a wideband radio communication system to simultaneously conduct radio communication between devices. In certain direct sequence wideband systems, the impact of an in-band narrowband signal on the reception of the wideband radio communication system varies with the relative positioning of the in-band narrowband carrier frequency. In particular, the closer the plurality of in-band narrowband carrier frequencies is to the outer edges of the bandwidth of the wideband carrier frequencies, the lower the interference and the better the reception. The present invention exploits this feature in the design of carrier frequency assignments of the overlaying system. The invention includes situations in which the narrowband carrier frequency of the TDMA or FDMA system remains at one carrier frequency, or when it is hopped to different frequencies in a manner to reduce noise interference.

Whether in the cellular/PCS bands, satellite bands, unlicensed bands, or any other frequency bands, it may be advantageous to run several distinct, uncoordinated wireless communication systems in the same band. In particular, it is of interest to overlay a wideband CDMA system and a narrowband TDMA or FDMA system. Overlaying a plurality of narrowband carrier frequencies with a plurality of wideband carrier frequencies does cause signal interference. Reducing the impact of this interference helps improve the quality and capacity of wireless communication systems. The quality and capacity of wireless communication systems are extremely important, especially in light of the dramatic increase in the number of available wireless communication devices. The present invention reduces the interference caused by overlaying the two systems and maintains interference at an acceptable level by judiciously assigning frequencies.

In a narrowband communication system such as TDMA or FDMA, the communication devices that are designed to use these systems include circuits which filter out white noise. Thus, the relative frequency location of an in-band wideband signal does not interfere with narrowband communication devices because the wideband signal that is passed by the narrowband filter of the narrowband receiver resembles white noise which is ignored. On the other hand, for a wideband communication system, the position of the plurality of in-band narrowband carrier frequencies will cause interference. In general, the further the plurality of in-band narrowband carrier frequencies is kept from the center frequencies of the plurality of wideband carrier frequencies, the less interference the wideband communication system will experience during operation. The present invention exploits this feature by judiciously placing the radio communication being conducted on the plurality of in-band narrowband carrier frequencies at the furthest edges of the bandwidth of the plurality of wideband carrier frequencies.

In general, there are two cases to consider when discussing the present invention. The first is where each of the plurality of narrowband carrier frequencies remains at an assigned frequency when handed over between cells in a cellular system, and the second is when the plurality of narrowband carrier frequencies are frequency hopped. In both cases, it is assumed that the wideband system is already set up so that its carrier frequencies are known to the narrowband system. When the narrowband carrier frequencies remain at one carrier frequency, they are placed as close to the edges of the bandwidth of the wideband carrier frequencies as possible. This effort to maximize the distance between the center frequencies of the wideband carrier frequencies and the narrowband carrier frequencies is done to reduce interference as previously discussed. One should also keep in mind that there are other constraints on a narrowband system, e.g.—frequency reuse to reduce self-interference. Thus, there is a compromise to be made between the requirement not to reuse frequencies in a cell and to assign frequencies within the cell to avoid interference between the overlapping systems.

In the case where the narrowband carrier frequencies are frequency hopped, a pseudo-random hopping pattern is used that judiciously reduces noise interference. Unlike standard frequency hopping schemes where it is beneficial to hop the narrowband frequencies onto all available frequencies with equal probability, with the present invention there exists a need to skew the hopping pattern so as to minimize interference with the wideband system. To that end, frequency slots that are close to the edges of the bandwidth of the wideband carrier frequencies are visited more often than those near the center frequency of the wideband carrier frequencies. Again, this is done in order to reduce the amount of interference between the narrowband and wideband systems during operation.

Referring to FIG. 1, a block diagram displaying the basic functions performed by a transmitter and receiver for a narrowband or wideband system is illustrated. The initial information content, which is usually voice data, is input into a microphone 10. The speech is then processed in a speech encoder 12 which converts the audio information into a data stream. Then the information is passed through an error control encoder 14 and an interleaver 16 for further processing. The information is then modulated with a modulator 18 which places the information onto a radio frequency carrier that is transmitted through an antenna (not shown). During transmission, the signal experiences fading, noise and interference 20.

The receiver, which is some distance away, receives the modulated radio frequency carrier through the use of an antenna (not shown) and a demodulator 22 processes the signal into usable information. The information is then passed through a deinterleaver 24 and an error control decoder 26 for further processing. Finally, the information is sent to a speech decoder 28 which converts the signal into an audible signal that can be transmitted with a speaker 30.

Figure 2:
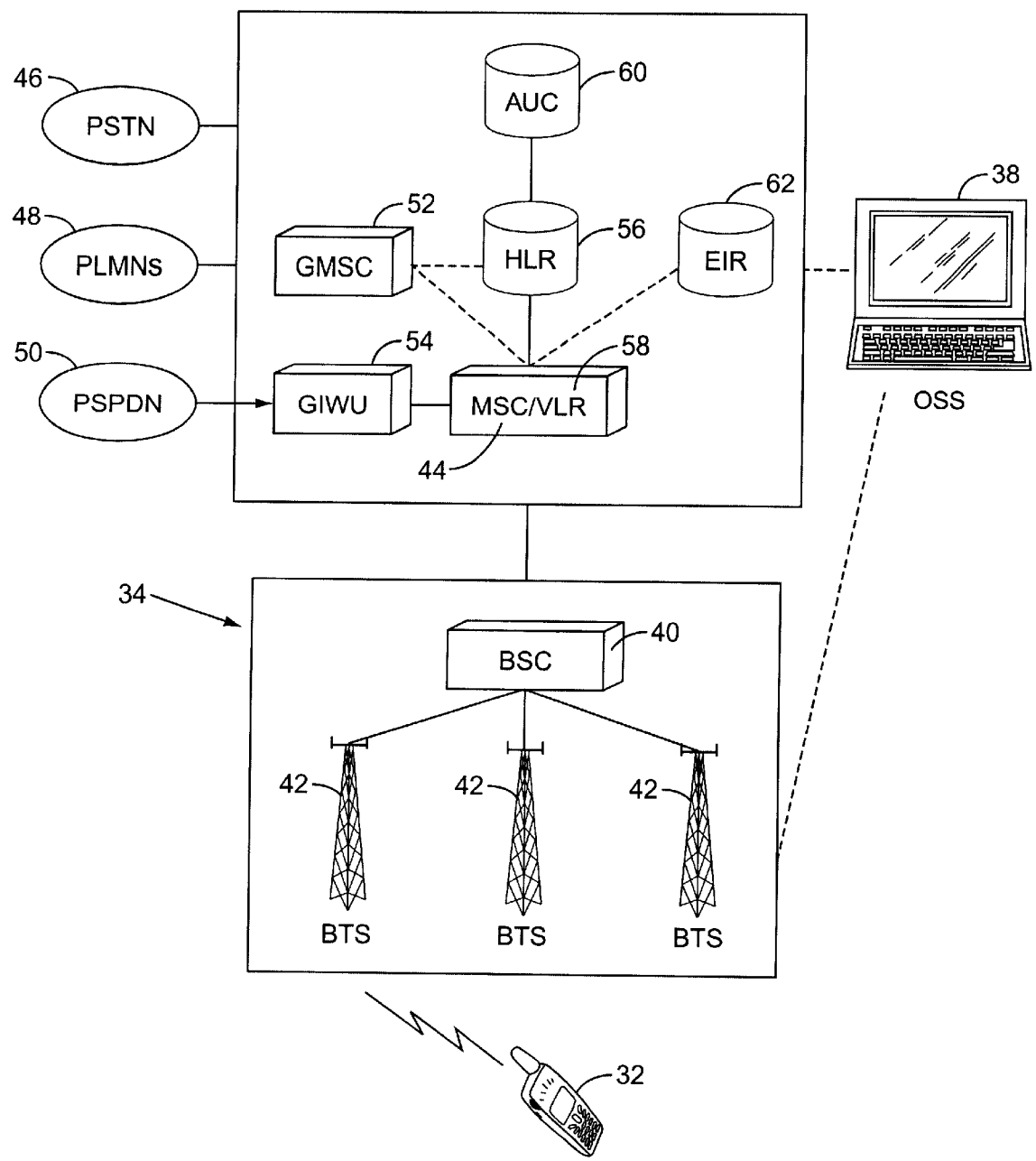
FIG. 2 represents a basic block diagram of a cellular system.

The invention may be used on existing cellular systems or cellular systems may be developed for the purpose of using the disclosed invention. FIG. 2 represents a block diagram of a cellular system that could use the disclosed invention. Ericsson, Inc. produces several cellular systems which could use the disclosed invention, such as the CMS 40 system. In preferred embodiments of the present invention, the disclosed method of overlaying wideband and narrowband carrier frequencies would be accomplished using a CMS 40 system. Both the software and the hardware of the CMS 40 system are developed in modules which allow network operators to have access to new functions and services by incorporating upgrades instead of purchasing entirely new systems. New functions and features implemented in software can easily be added as separate function blocks, without affecting traffic handling in the exchange. One skilled in the art would recognize that the present invention may be used in many different types of communication systems and the disclosure of the CMS 40 system is by way of example only.

As depicted in FIG. 2, all cellular systems are comprised of at least a mobile station 32, a base station system 34, a switching center 36, and an operation and support system 38. The mobile station 32 can be any hand-held, transportable, or car phone that a subscriber uses to make or receive a call. All of the radio-related functions of the cellular system are performed in the base station system 34. A base station controller 40 provides all of the control functions and physical links between the switching center 36 and a plurality of base transceiver stations 42. The base station controller 40 generally has a computer system and a high capacity switch that provides functions such as handover, cell configuration data, and control of radio frequency power levels in the base transceiver stations 42. The base transceiver stations 42 handle the radio interface to the mobile stations 32 through the use of transceivers and antennas (not shown). Generally, a group of base transceiver stations 42 are controlled by a single base station controller 40.

The switching center 36 is responsible for call processing, generating call progress tones (dial tones), and billing charges. The switching center 36 is often referred to as the "brains" of the entire network. In the switching center 36 a mobile services switching center 44 performs the telephony switching functions of the system. In essence, the mobile services switching center 44 controls calls to and from other telephone data systems, such as a public switched telephone network 46, a public land mobile network 48, or a public switched public data network 50. The interconnection of calls is generally accomplished with the assistance of separate pieces of hardware 52, 54 that actually connect the mobile station 32 with the network on which the user desires to communicate, as is commonly known in the art.

The switching center 36 also contains various databases that keep track of information the system needs to operate, such as a home location register 56 and a visitor location register 58 which is part of the mobile services switching center 44. The switching center 36 is also generally provided with an authentication center 60 that provides authentication and encryption parameters that verify the user's identity and ensures the confidentiality of each call. In addition, an equipment identify register 62 is provided that contains a database about the mobile equipment identities that prevents calls from stolen, unauthorized, or defective mobile stations 32. The authentication center 60 and the equipment identify register 62 may be implemented as stand-alone nodes or as a combined unit.

The operations and support system 38 is connected to all equipment in the switching center 36 and to the base station controller 34 and serves as the point from which the network operator monitors and controls the cellular system. The purpose of the operations and maintenance center 38 is to offer the cellular system operator cost-effective support for centralized, regional and local operational and maintenance activities required by the network. One skilled in the art would recognize that the preceding discussion on the basic design of a cellular network serves as an example only and that several variations in the basic design of cellular networks exist, all of which could use the disclosed invention.

Figure 3:
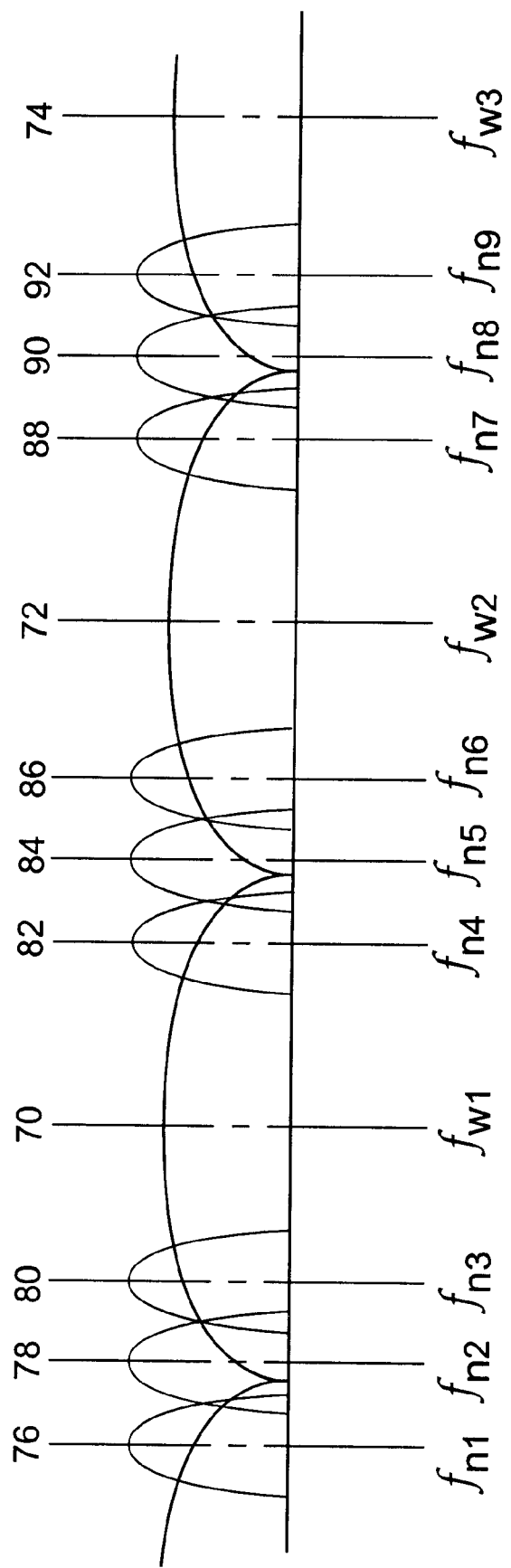
FIG. 3 represents a detailed schematic of the frequency assignments of the present invention.

Referring to FIG. 3, the present invention discloses a method of conducting wireless communication in which a plurality of wideband carrier frequencies 70, 72, and 74 is provided for radio communication. The center frequency of each of the wideband carrier frequencies 70, 72, and 74 is shown by a neutral line and the bandwidth is shown by the limits of the curved convex lines defining the outer edges of the bandwidth. In addition, a plurality of narrowband carrier frequencies 76, 78, 80, 82, 84, 86, 88, 90 and 92 is provided that share the same spectrum with the wideband frequencies 70, 72, and 74. The waveforms of the narrowband carrier frequencies 76, 78, 80, 82, 84, 86, 88, 90 and 92 are likewise shown by curved convex lines with center frequencies shown by vertical lines. In particular, the narrowband carrier frequencies 76, 78, 80, 82, 84, 86, 88, 90 and 92 that are used for radio communication are preferentially located at the edges of the bandwidth of the plurality of wideband carrier frequencies 70, 72 and 74. However, the assigned frequencies for the narrowband system may span the entire allocation for the wideband system.

The invention pertains to methods that improve the probability of using narrowband carrier frequencies between the edges of adjacent wideband carrier frequencies. This is achieved by 1) using a narrowband carrier frequency closer to the edge of the bandwidth of the wideband carrier frequencies in preference to narrowband carriers that overlay the wideband carriers (successive assignment); 2) limiting the choice of narrowband carrier frequencies to lie between the edges of the wideband carrier frequencies; and 3) using frequency hopping for the narrowband carrier frequencies so that the probability of using the narrowband carrier frequencies closer to the edge of the bandwidth of the wideband carrier frequencies is greater due to judicious frequency assignment. Therefore, internal radio interference is kept at acceptable levels because the narrowband frequencies 76, 78, 80, 82, 84, 86, 88, 90 and 92 are kept as far away as possible from the center frequency of the wideband carrier frequencies 70, 72 and 74.

The amount of data being sent over the plurality of narrowband carrier frequencies 76, 78, 80, 82, 84, 86, 88, 90 and 92 varies according to the amount of users on the wireless network at different periods in time. As narrowband carrier frequencies that are closer to the outer edge of the bandwidth of the wideband carrier frequencies 70, 72 and 74 (e.g., narrowband carrier frequencies 78, 84 and 90) lose radio traffic, the system optimally uses frequency hopping to transfer radio traffic from the outer narrowband carrier frequencies (e.g., narrowband carrier frequencies 76, 80, 82, 86, 88 and 92) to the narrowband frequencies that are closer to the outer edge of the bandwidth of the wideband carrier frequencies 70, 72 and 74.

Figure 4:
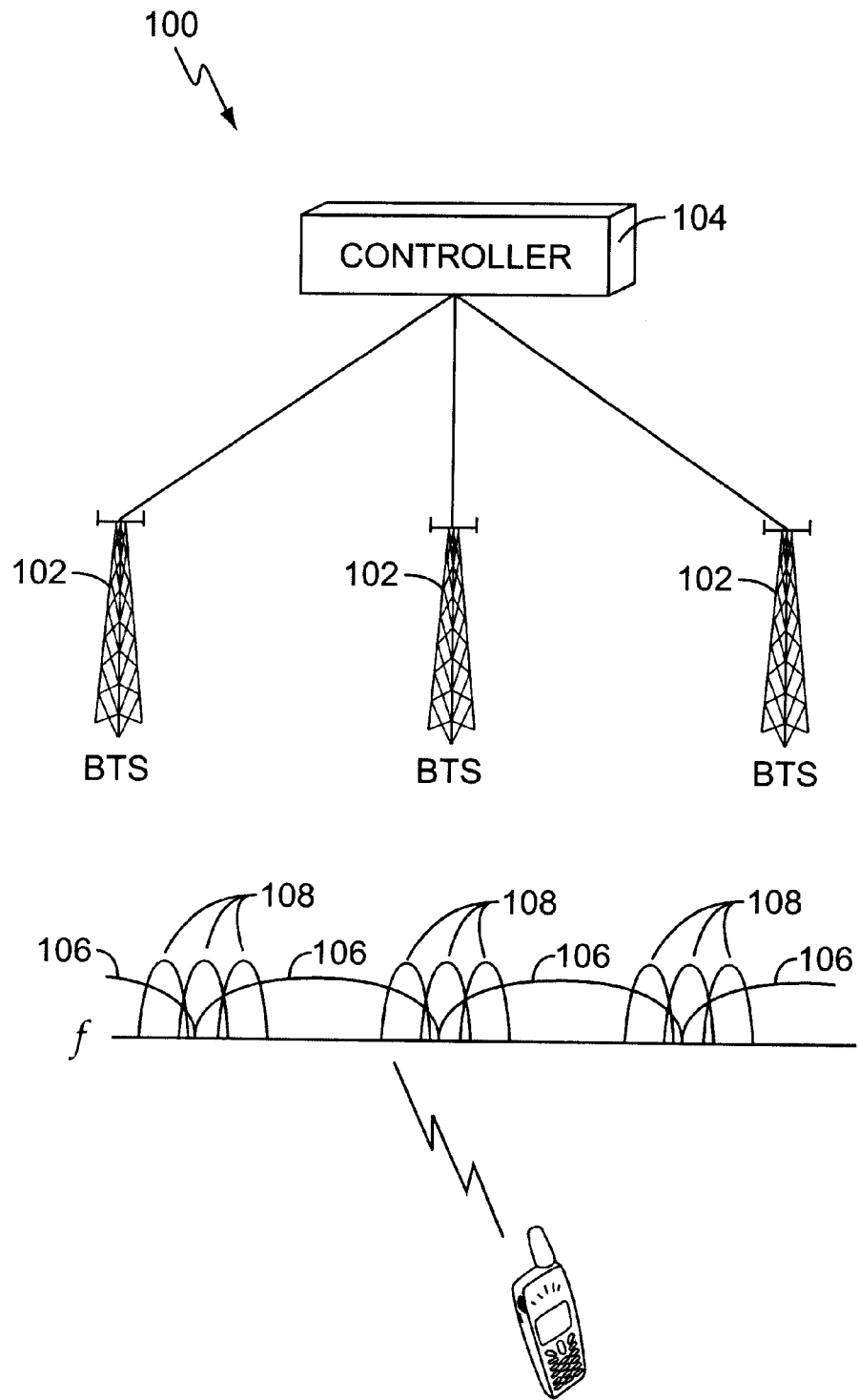
FIG. 4 is a diagrammatic illustration of a wireless communication system which uses frequency overlaying.

Referring to FIG. 4, the present invention also pertains to a wireless communication system 100. The wireless communication system 100 is provided with a transmitter 102 that is capable of transmitting a plurality of wideband carrier frequencies 106 and a plurality of narrowband carrier frequencies 108. A control unit 104 is connected with the transmitter 102 which preferentially directs radio communication over the plurality of narrowband carrier frequencies 108 using frequency hopping, as set forth above, to minimize noise interference. In the disclosed preferred embodiment, the control unit 104 comprises a base station controller 40 as depicted in FIG. 3, that is capable of adjusting the center frequencies of the narrowband carrier frequencies 108 in a known manner using a known frequency hopping control algorithm. One skilled in the art would recognize that the exact nature of the control unit 104 would vary in different wireless communication systems, such as cellular, satellite, or military systems.

During operation of the wireless communication system 100, the control unit 104 preferentially assigns narrowband carrier frequencies 108 at the adjacent edges of the bandwidth of the wideband frequencies 106 based on the amount of overall radio traffic in the wireless communication system 100. The control unit 104 continuously maximizes the narrowband radio communications on the narrowband carrier frequencies 108 having a center frequency closer to the edge of the bandwidth of the plurality of wideband carrier frequencies 106. As previously discussed, this judicious narrowband frequency assignment minimizes noise interference and allows more users to use the wireless communication system 100 at the same time.

Frequency hopping is a process by which a narrowband carrier frequency 108 operating at one center frequency shifts to a second center frequency over a period of time. As such, during operation of the present invention, when a narrowband carrier frequency 108 that is closer to the edge of the bandwidth of a wideband carrier frequency 106 becomes available due to a stop in radio communication, the control unit 104 will automatically preferentially direct the transmitter 102 to shift the radio communication being conducted on one narrowband carrier frequency 108 to a narrowband carrier frequency 108 closer to the edges of the bandwidth of the wideband carrier frequency 106. Therefore, the wireless communication system 100 continuously attempts to reduce internal interference of carrier signals by a judicious narrowband carrier frequency 108 assignment pattern, which preferentially assigns radio communication on the narrowband carrier frequencies 108 at the edge of the bandwidths of the wideband carrier frequencies 106.

One skilled in the art of wireless communication would recognize that the transmitters 102 depicted in FIG. 4 may be selected from many commonly used transmitters in the wireless communication industry. Alternatively, the transmitter 102 could be a satellite or any other device that is capable of generating radio signals. The control unit 104 may comprise a single control unit using a known computer system and software or, as previously discussed, may be the base station controller 40 of a wireless communication system known in the art that is capable of being upgraded.

In the invention, if the amount of data traffic on the wideband system is known to the narrowband system, then the narrowband system can be biased so that the lightly loaded wideband carrier frequencies 106 get visited by the narrowband carrier frequencies 108 more often than the heavily loaded wideband carrier frequencies 106. In addition, narrowband carrier frequencies 108 can be assigned frequencies further from the edges of the wideband carrier frequencies 106 as traffic is reduced on the wideband carrier frequencies 106. When the narrowband carrier frequencies 108 are not full of data traffic, there is a choice to be made between packing narrowband users over a few narrowband carrier frequencies 104 at the edge of the bandwidth of the wideband carrier frequencies 106 or spreading them more evenly among the narrowband carrier frequencies 108. In particular, if the narrowband system is operating under the TDMA communication protocol, then users are preferably packed by filling as many time slots as possible. In the context of the present invention, the preferred solution is to pack narrowband users over the least amount of narrowband carrier frequencies 108 as possible. This gives the control unit 104 more ability to freely hop narrowband carrier frequencies 108 in a preferred relation to the wideband system.

Although several preferred embodiments of this invention have been disclosed, one skilled in the art would recognize that the disclosed methods can be utilized in numerous types of communication systems. It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of this invention.

What is claimed is:

1. A method of conducting wireless communication, the method comprising:
   providing at least one direct sequence (DS) wideband carrier frequency having a relatively wide instantaneous bandwidth;
   providing at least one narrowband carrier frequency having a center frequency positioned within said bandwidth
   communicating information over said at least one wideband carrier frequency using at least one direct sequence technique transmission technique; and
   communicating information over said at least one narrowband carrier frequency during said communicating information over said at least one wideband carrier frequency.

2. The method of claim 1, further comprising providing a plurality of narrowband carrier frequencies each having a center frequency positioned within said bandwidth of said at least one wideband carrier frequency.

3. The method of claim 2, wherein said plurality of narrowband carrier frequencies are equally spread within said bandwidth of said at least one wideband carrier frequency.

4. The method of claim 1, wherein said center frequency of said at least one narrowband carrier frequency is positioned generally adjacent an outer edge of said bandwidth of said at least one wideband carrier frequency.

5. The method of claim 1, wherein at least one of said center frequencies of said plurality of narrowband carrier frequencies is positioned generally adjacent an outer edge of said bandwidth of said at least one wideband carrier frequency.

6. The method of claim 5, wherein each of said center frequencies of said plurality of narrowband carrier frequencies are positioned generally adjacent outer edges of said bandwidth of said at least one wideband carrier frequency.

7. The method of claim 1 further comprising frequency hopping said at least one narrowband carrier frequency.

8. The method of claim 2, further comprising frequency hopping each of said plurality of narrowband carrier frequencies.

9. The method of claim 4, further comprising frequency hopping said at least one narrowband carrier frequency.

10. The method of claim 5, further comprising frequency hopping a number of said narrowband carrier frequencies.

11. The method of claim 6, further comprising frequency hopping each of said plurality of narrowband carrier frequencies.

12. The method of claim 1, wherein said wireless communication comprises satellite communication.

13. The method of claim 1, wherein said wireless communication comprises cellular communication.

14. A method of conducting wireless communication, the method comprising:
   providing a plurality of direct sequence (DS) wideband carrier frequencies each having a relatively wide instantaneous bandwidth;

providing a plurality of narrowband carrier frequencies each having a center frequency, said center frequencies of said plurality of narrowband carrier frequencies being positioned within said bandwidths of said plurality of wideband carrier frequencies;

communicating information over said plurality of wideband carrier frequencies using at least one direct sequence transmission technique; and communicating information over said plurality of narrowband carrier frequencies during said communicating information over said plurality of wideband carrier frequencies.

15. The method of claim 14, wherein said center frequencies of said plurality of narrowband carrier frequencies are positioned generally adjacent outer edges of said bandwidths of said plurality of wideband carrier frequencies.

16. The method of claim 15, further comprising frequency hopping at least one of said plurality of narrowband carrier frequencies.

17. The method of claim 15, further comprising frequency hopping each of said plurality of narrowband carrier frequencies.

18. The method of claim 14, wherein said plurality of narrowband carrier frequencies are equally spread within said bandwidths of said plurality of wideband carrier frequencies.

19. The method of claim 14, wherein said wireless communication comprises satellite communication.

20. The method of claim 14, wherein said wireless communication comprises cellular communication.

21. A wireless communication system, comprising:
a transmitter configured to transmit at least one narrowband carrier frequency and at least one direct sequence (DS) wideband carrier frequency having a relatively wide instantaneous bandwidth; and a control unit coupled to and controlling said transmitter, said control unit selecting a center frequency of said at least one narrowband carrier frequency such that said center frequency of said at least one narrowband carrier frequency transmitted by said transmitter is positioned within said bandwidth of said at least one wideband carrier frequency transmitted by said transmitter.

22. The system of claim 21, wherein said transmitter is configured to transmit a plurality of narrowband frequencies each having a center frequency selected by said control unit that is positioned within said bandwidth of said at least one wideband carrier frequency.

23. The system of claim 22, wherein said plurality of narrowband frequencies are equally spread within said bandwidth of said at least one wideband carrier frequency.

24. The system of claim 21, wherein said center frequency of said at least one narrowband carrier frequency is positioned generally adjacent an outer edge of said bandwidth of said at least one wideband carrier frequency.

25. The system of claim 22, wherein at least one of said center frequencies of said plurality of narrowband center frequencies is positioned generally adjacent an outer edge of said bandwidth of said at least one wideband carrier frequency.

26. The system of claim 25, wherein each of said center frequencies of said plurality of narrowband carrier frequencies are positioned generally adjacent outer edges of said bandwidth of said at least one wideband carrier frequency.

27. The system of claim 21, wherein said control unit shifts said center frequency of said at least one narrowband carrier frequency within said bandwidth of said at least one wideband carrier frequency for transmission by said transmitter in response to radio traffic in said wireless communication system.

28. The system of claim 25, wherein said control unit shifts a number of said center frequencies of said plurality of narrowband carrier frequencies within said bandwidth of said at least one wideband carrier frequency for transmission by said transmitter in response to radio traffic in said wireless communication system.

29. The system of claim 26, wherein said control units shifts said center frequency of each of said plurality of narrow carrier frequencies within said bandwidth of said at least one wideband carrier frequency for transmission by said transmitter in response to radio traffic in said wireless communication system.

30. The system of claim 21, wherein said transmitter is a satellite transmitter of radio signals.

31. The system of claim 21, wherein said transmitter is a cellular transmitter of radio signals.

32. A wireless communication system, comprising:
a transmitter configured to transmit a plurality of narrowband carrier frequencies and a plurality of direct sequence (DS) wideband carrier frequencies having relatively wide instantaneous bandwidths; and a control unit coupled to and controlling said transmitter, said control unit selecting a center frequency of each of said plurality of narrowband carrier frequencies such that said center frequency of each of said plurality of narrowband carrier frequencies transmitted by said transmitter is positioned within said bandwidths of said plurality of wideband carrier frequencies transmitted by said transmitter.

33. The system of claim 32, wherein said center frequencies of said plurality of narrowband carrier frequencies are positioned generally adjacent outer edges of said bandwidths of said plurality of wideband carrier frequencies.

34. The system of claim 33, wherein said control unit shifts said center frequency of at least one of said narrowband carrier frequencies in response to radio traffic in said wireless communication system.

35. The system of claim 33, wherein said control unit shifts said center frequency of each of said plurality of narrowband carrier frequencies in response to radio traffic in said wireless communication system.

36. The system of claim 32, wherein said plurality of narrowband carrier frequencies are equally spread within said bandwidths of said plurality of wideband carrier frequencies.

37. The system of claim 32, wherein said transmitter is a satellite transmitter of radio signals.

38. The system of claim 32, wherein said transmitter is a cellular transmitter of radio signals.

39. The system of claim 24, wherein said control unit shifts said center frequency of said at least one narrowband carrier frequency within said bandwidth of said at least one wideband carrier frequency for transmission by said transmitter in response to radio traffic in said wireless communication system.

40. The method of claim 1 further comprising selecting said at least one narrowband carrier frequency such that frequency positions in said bandwidth distant from a corresponding center of said at least one wideband carrier frequency are preferentially selected.

41. The method of claim 40 wherein said frequency positions are preferentially selected with increasing preference as said frequency positions move farther from said center.

42. The system of claim 21 wherein said controller selects said center frequency of said at least one narrowband carrier frequency such that frequency positions in said bandwidth distant from a corresponding center of said at least one wideband carrier frequency are preferentially selected.

43. The system of claim 42 wherein said controller selects frequency positions with increasing preference as said frequency positions approach an outer limit of said bandwidth.

44. A method of communicating information over a wireless communications system, comprising:
   communicating information over a wideband carrier frequency using a direct sequence transmission technique;
   communicating information over a narrowband carrier frequency during said communicating information over said wideband carrier frequency;
   wherein said narrowband carrier frequency has a frequency position relative to said wideband carrier frequency such that said narrowband carrier frequency at least partially overlays a bandwidth associated with said wideband carrier frequency; and
   selecting said frequency position of said narrowband carrier frequency such that frequency positions in said bandwidth distant from a center of said wideband carrier frequency are preferentially selected.

45. The method of claim 44 wherein said selecting said frequency position of said narrowband carrier frequency comprises giving increasing preference to frequency positions proximate an outer limit of said bandwidth.

46. The method of claim 44 wherein said selecting said frequency position of said narrowband carrier frequency comprises selecting said frequency position based on the distance thereof from a center of said bandwidth.

47. The method of claim 46 wherein selecting said frequency position of said narrowband carrier frequency comprises selecting said frequency position based on the distance thereof from a center of said bandwidth and based on a traffic level on said wideband carrier frequency.

48. The method of claim 44 wherein said communicating information over a narrowband carrier frequency comprises communicating information over said narrowband carrier frequency and a plurality of other narrowband carrier frequencies using a frequency hopping technique.

49. The method of claim 14 further comprising selecting frequency positions of said center frequencies of said plurality of narrowband carrier frequencies such that frequency positions distant from a corresponding center of at least one of said wideband carrier frequencies are preferentially selected.

50. The method of claim 14 wherein said frequency positions are preferentially selected with increasing preference as said frequency positions move farther from said center.

51. The system of claim 32 wherein said controller selects said center frequency of said at least one narrowband center frequency such that frequency positions distant from a corresponding center of at least one of said wideband carrier frequencies are preferentially selected.

52. The system of claim 32 wherein said controller selects frequency positions with increasing preference as said frequency positions approach an outer limit of a corresponding bandwidth of said at least one of said wideband carrier frequencies.

* * * * *